United States Patent
Jeffery et al.

(10) Patent No.: US 10,657,457 B1
(45) Date of Patent: May 19, 2020

(54) AUTOMATIC SELECTION OF HIGH QUALITY TRAINING DATA USING AN ADAPTIVE ORACLE-TRAINED LEARNING FRAMEWORK

(71) Applicant: GROUPON, INC., Chicago, IL (US)

(72) Inventors: Shawn Ryan Jeffery, Burlingame, CA (US); Nick Pendar, San Ramon, CA (US); Mark Thomas Daly, San Francisco, CA (US); Matthew DeLand, San Francisco, CA (US); David Alan Johnston, Portola Valley, CA (US)

(73) Assignee: GROUPON, INC., Chicago, IL (US)

( * ) Notice: Subject to any disclaimer, the term of this patent is extended or adjusted under 35 U.S.C. 154(b) by 851 days.

(21) Appl. No.: 14/578,200

(22) Filed: Dec. 19, 2014

Related U.S. Application Data

(60) Provisional application No. 61/920,247, filed on Dec. 23, 2013.

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| | | |
|---|---|---|
| 5,825,646 A | 10/1998 | Keeler et al. |
| 5,826,240 A | 10/1998 | Brockman et al. |
| 5,826,249 A | 10/1998 | Skeirik |
| 6,092,072 A | 7/2000 | Guha et al. |
| 7,418,431 B1 | 8/2008 | Nies et al. |
| 7,480,640 B1 | 1/2009 | Elad et al. |
| 7,512,582 B2 | 3/2009 | Cao et al. |
| 7,925,620 B1 | 4/2011 | Yoon |
| 8,112,421 B2 * | 2/2012 | Sun ...................... G06F 16/334 707/737 |
| 8,402,543 B1 | 3/2013 | Ranjan et al. |
| 8,620,842 B1 | 12/2013 | Cormack |

(Continued)

OTHER PUBLICATIONS

Javani, M. et al., "Clustering and feature selection via PSO algorithm," 2011 Intl. Symp. on Artificial Intelligence and Signal Processing (AISP 2011) pp. 71-76.*

(Continued)

*Primary Examiner* — Kakali Chaki
*Assistant Examiner* — Brian M Smith
(74) *Attorney, Agent, or Firm* — Alston & Bird, LLP

(57) ABSTRACT

In general, embodiments of the present invention provide systems, methods and computer readable media for an adaptive oracle-trained learning framework for automatically building and maintaining models that are developed using machine learning algorithms. In embodiments, the framework leverages at least one oracle (e.g., a crowd) for automatic generation of high-quality training data to use in deriving a model. Once a model is trained, the framework monitors the performance of the model and, in embodiments, leverages active learning and the oracle to generate feedback about the changing data for modifying training data sets while maintaining data quality to enable incremental adaptation of the model.

21 Claims, 14 Drawing Sheets

(56) References Cited

U.S. PATENT DOCUMENTS

| | | | |
|---|---|---|---|
| 8,843,427 B1* | 9/2014 | Lin | G06N 99/005 705/16 |
| 9,390,112 B1 | 7/2016 | Daly et al. | |
| 2003/0130899 A1 | 7/2003 | Ferguson et al. | |
| 2003/0236691 A1 | 12/2003 | Casatl et al. | |
| 2004/0049473 A1 | 3/2004 | Gower et al. | |
| 2004/0205482 A1 | 10/2004 | Basu et al. | |
| 2005/0049990 A1 | 3/2005 | Milenova et al. | |
| 2006/0259197 A1 | 11/2006 | Boe et al. | |
| 2007/0282766 A1 | 12/2007 | Hartman et al. | |
| 2008/0147574 A1 | 6/2008 | Chidlovskii | |
| 2009/0119268 A1 | 5/2009 | Bandaru et al. | |
| 2009/0193328 A1 | 7/2009 | Reis et al. | |
| 2011/0191335 A1 | 8/2011 | Miller et al. | |
| 2011/0313977 A1 | 12/2011 | Al-Kateb et al. | |
| 2012/0054184 A1 | 3/2012 | Masud et al. | |
| 2012/0054226 A1 | 3/2012 | Cao et al. | |
| 2012/0254186 A1 | 10/2012 | Winner et al. | |
| 2012/0284213 A1 | 11/2012 | Lin et al. | |
| 2012/0303555 A1 | 11/2012 | Yakout et al. | |
| 2013/0198119 A1 | 8/2013 | Eberhardt et al. | |
| 2013/0246315 A1 | 9/2013 | Joshi et al. | |
| 2013/0279795 A1 | 10/2013 | Shlain et al. | |
| 2014/0101544 A1 | 4/2014 | Albrecht et al. | |
| 2014/0129261 A1 | 5/2014 | Bothwell et al. | |
| 2014/0172767 A1 | 6/2014 | Chen et al. | |
| 2014/0279716 A1 | 9/2014 | Cormack et al. | |
| 2014/0279745 A1 | 9/2014 | Esponda et al. | |
| 2014/0297570 A1 | 10/2014 | Garera et al. | |
| 2015/0161386 A1 | 6/2015 | Gupta et al. | |
| 2015/0356451 A1 | 12/2015 | Gupta et al. | |
| 2016/0034809 A1 | 2/2016 | Trenholm et al. | |
| 2016/0071023 A1 | 3/2016 | Eicher et al. | |
| 2016/0331233 A1 | 11/2016 | Mensinger et al. | |

OTHER PUBLICATIONS

Kayacik, H. et al., "Selecting features for intrusion detection: A feature relevance analysis on KDD 99 intrusion detection datasets," Proc. of the 3rd Annual Conf. on Privacy, Security, and Trust (2005) 6 pp.*

Mao, C.-H. et al., "Semi-supervised Co-training and Active Learning based Approach for Multi-view Intrusion Detection," Proc. of the 2009 ACM Symp. on Applied Computing (2009) pp. 2042-2048.*

North, H. et al., "Classifying agricultural land uses with time series of satellite images," 2012 IEEE Intl. Geoscience and Remote Sensing Symp. (IGARSS 2012) pp. 5693-5696.*

Dredze, M. et al., "Active learning with confidence," Proc. of ACL-08:HTL, Short Papers (2008) pp. 233-236. (Year: 2008).*

Dredze, M. et al., "Confidence-weighted linear classification," Proc. of the 25th Intl. Conf. on Machine Learning (2008) 8 pp. (Year: 2008).*

Joshi, A. et al., "Mutli-class active learning for image classification," Mitsubishi Electric Research Laboratories Technical Report TR-2009-034 (2009) 10 pp. (Year: 2009).*

Lewis, D. et al., "RCV1: A new benchmark collection for Text Categorization Research" Journal of Machine Learning Research, vol. 5 (2004) pp. 361-397. (Year: 2004).*

U.S. Appl. No. 14/918,362, filed Oct. 20, 2015.
U.S. Appl. No. 14/817,005, filed Aug. 3, 2015.
U.S. Appl. No. 14/578,210, filed Dec. 19, 2014.
U.S. Appl. No. 14/578,205, filed Dec. 19, 2014.
U.S. Appl. No. 14/578,200, filed Dec. 19, 2014.
U.S. Appl. No. 14/578,192, filed Dec. 19, 2014.
U.S. Appl. No. 14/088,247, filed Nov. 22, 2011.
U.S. Appl. No. as filed Sep. 16, 2013, U.S. Appl. No. 14/038,661.

Tong, et al., "Support Vector Machine Active Learning with Applications to Text Classification," Journal of Machine Learning Research, pp. 45-66, (2001).

Settles, "Active Learning Literature Survey," Computer Sciences Technical Report 1648, University of Wisconsin-Madison, 52.55-56 (2010): 11.

Settles, "Active Learning Literature Survey," Computer Sciences Technical Report 1648, University of Wisconsin-Madison, (2009).

Brinker, "Incorporating Diversity in Active Learning with Support Vector Machines," Proceedings of the Twentieth International Conference on Machine Learning (ICML-2003), (2003).

Basu, et al., "Active Semi-Supervision for Pairwise Constrained Clustering," Proceedings of the SIAM International Conference on Data Mining (SDM-2004), Society for Industrial and Applied Mathematics, pp. 333-344, (2004).

Whang et al.—"Entity Resolution with Iterative Blocking"—2009—https://dl.acm.org/citation.cfm7icM559870 (Year: 2009) 219-231.

Transfer Learning by Finetuning Pretrained CN Ns Entirely with Synthetic Images, Param Rajpura 1 Alakh Aggarwal, Manik Goyal, Sanchit Gupta , Jonti Talukdar, Hristo Bojinov, and Ravi Hegde Indian Institute of Technology Gandhinagar, Gandhinagar 382355, India 2018 pp. 517-528.

ACM Digital Library Beyond myopic inference in big data pipelines, Karthik Raman, Adith Swaminathan, Johannes Gehrke, Thorsten Joachims, Proceeding KDD '13 Proceedings of the 19th ACM SIGKDD international conference on Knowledge discovery and data mining pp. 86-94 Aug. 11-14, 2013.

ACM Digital Library A Review of User Interface Design for Interactive Machine Learning, John J. Dudley & Per Ola Kristensson, Journal ACM Transactions on Interactive Intelligent Systems (TiiS)—Special Issue on Human-Centered Machine Learning archive vol. 8 Issue 2, Jul. 2018, pp. 1-37.

"Arnold: Declarative Crowd-Machine Data Integration1": Jeffery, 2013.

* cited by examiner

AUTOMATIC SELECTION OF HIGH QUALITY TRAINING DATA USING AN ADAPTIVE ORACLE-TRAINED LEARNING FRAMEWORK

CROSS-REFERENCE TO RELATED APPLICATIONS

This application claims the benefit of U.S. Provisional Application No. 61/920,247, entitled "AUTOMATIC SELECTION OF HIGH QUALITY TRAINING DATA USING AN ADAPTIVE CROWD-TRAINED LEARNING FRAMEWORK," and filed Dec. 23, 2013, the entire contents of which are hereby incorporated by reference.

This application is related to the following concurrently filed, co-pending, and commonly assigned applications: U.S. application Ser. No. 14/578,192, filed Dec. 19, 2014, entitled "PROCESSING DYNAMIC DATA USING AN ADAPTIVE ORACLE-TRAINED LEARNING SYSTEM."

FIELD

Embodiments of the invention relate, generally, to an adaptive system for building and maintaining machine learning models.

BACKGROUND

A system that automatically identifies new businesses based on data sampled from a data stream representing data collected from a variety of online sources (e.g., websites, blogs, and social media) is an example of a system that processes dynamic data. Analysis of such dynamic data typically is based on data-driven models that depend on consistent data, yet dynamic data are inherently inconsistent in both content and quality.

Current methods for building and maintaining models that process dynamic data exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for building and maintaining machine learning models that process dynamic data.

Data quality fluctuations may affect the performance of a data-driven model, and, in some cases when the data quality and/or statistical distribution of the data has changed over time, the model may have to be replaced by a different model that more closely fits the changed data. Obtaining a set of accurately distributed, high-quality training data instances for derivation of a model is difficult, time-consuming, and/or expensive. Typically, high-quality training data instances are data that accurately represent the task being modeled, and that have been verified and labeled by at least one reliable source of truth (an oracle, hereinafter) to ensure their accuracy.

There is a declarative framework/architecture for clear definition of the end goal for the output data. The framework enables end-users to declare exactly what they want (i.e., high-quality data) without having to understand how to produce such data. Once a model has been derived from an initial training data set, being able to perform real time monitoring of the performance of the model as well as to perform data quality assessments on dynamic data as it is being collected can enable updating of the training data set so that the model may be adapted incrementally to fluctuations of quality and/or statistical distribution of dynamic data. Incremental adaptation of a model reduces the costs involved in repeatedly replacing the model.

As such, and according to some example embodiments, the systems and methods described herein are therefore configured to implement an adaptive oracle-trained learning framework for automatically building and maintaining machine learning models that are developed using machine learning algorithms. In embodiments, the framework leverages at least one oracle (e.g., a crowd) for automatic generation of high-quality training data to use in deriving a model. Once a model is trained, the framework monitors the performance of the model and, in embodiments, leverages active learning and the oracle to generate feedback about the changing data for modifying training data sets while maintaining data quality to enable incremental adaptation of the model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 13:
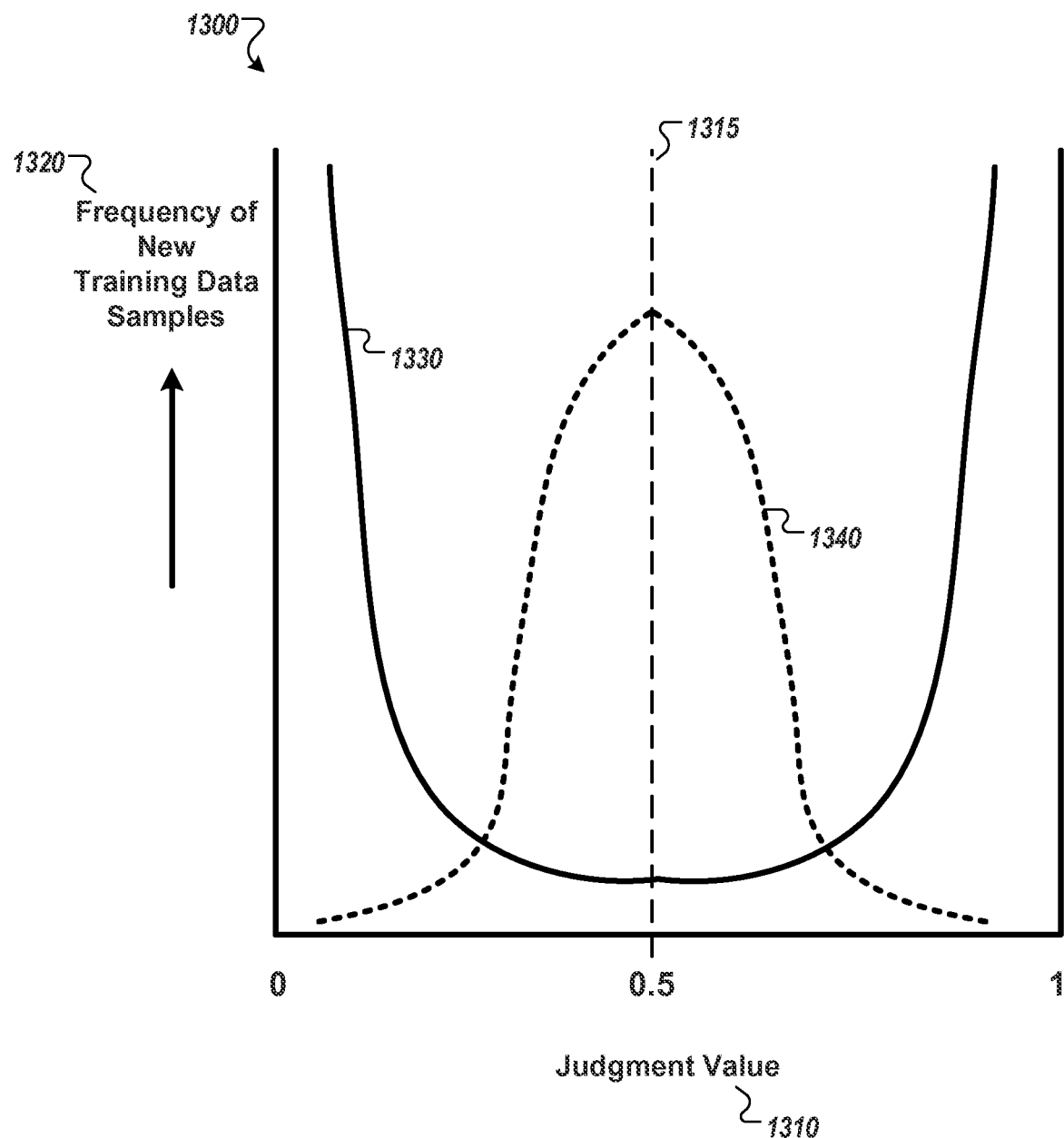
Figure 14:
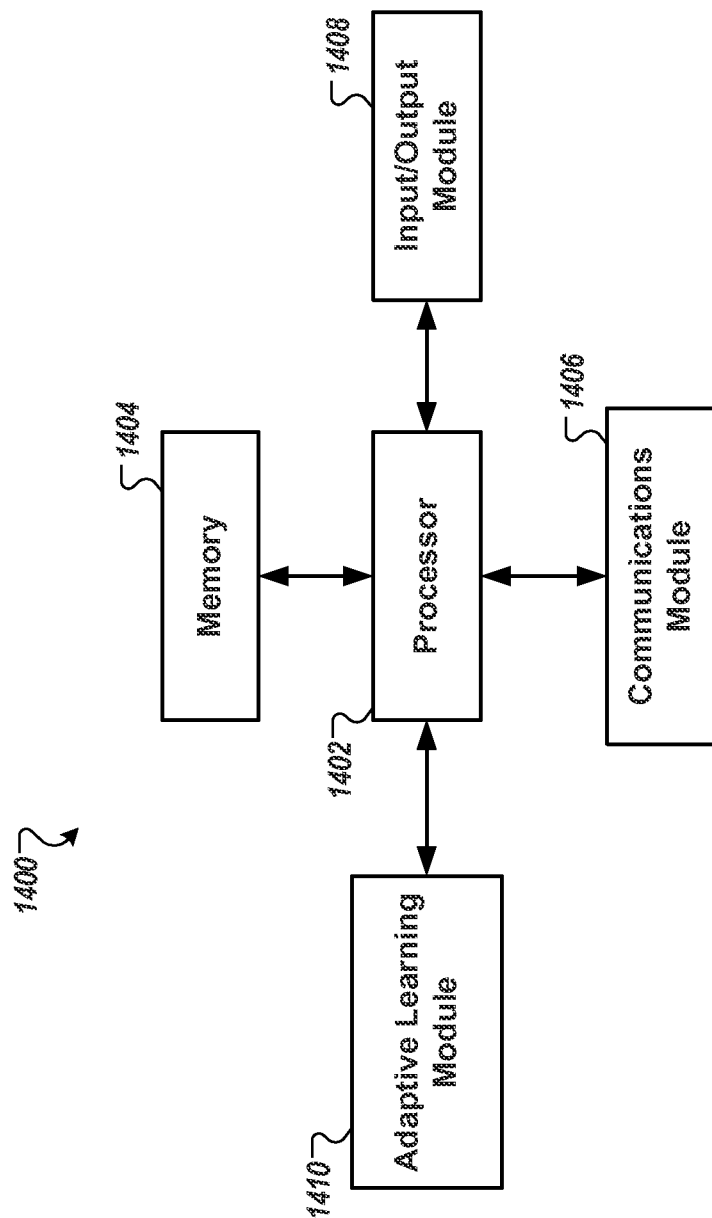

FIG. 13 is an illustration of various different effects of active learning and dynamic data quality assessment on selection of new data samples to be added to an exemplary training data set for a binary classification model in accordance with some embodiments discussed herein; and FIG. 14 illustrates a schematic block diagram of circuitry that can be included in a computing device, such as an adaptive learning system, in accordance with some embodiments discussed herein.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

Data being continuously sampled from a data stream representing data collected from a variety of online sources (e.g., websites, blogs, and social media) is an example of dynamic data. A system that automatically performs email fraud identification based on data sampled from a data stream is an example of a system that processes dynamic data. Analysis of such dynamic data typically is based on data-driven models that can be generated using machine learning. One type of machine learning is supervised learning, in which a statistical predictive model is derived based on a training data set of examples representing the modeling task to be performed.

The statistical distribution of the set of training data instances should be an accurate representation of the distribution of data that will be input to the model for processing. Additionally, the composition of a training data set should be structured to provide as much information as possible to the model. However, dynamic data is inherently inconsistent. The quality of the data sources may vary, the quality of the data collection methods may vary, and, in the case of data being collected continuously from a data stream, the overall quality and statistical distribution of the data itself may vary over time.

Data quality fluctuations may affect the performance of a data-driven model, and, in some cases when the data quality and/or statistical distribution of the data has changed over time, the model may have to be replaced by a different model that more closely fits the changed data. Obtaining a set of accurately distributed, high-quality training data instances for derivation of a model is difficult, time-consuming, and/or expensive. Typically, high-quality training data instances are data that accurately represent the task being modeled, and that have been verified and labeled by at least one oracle to ensure their accuracy. Once a model has been derived from an initial training data set, being able to perform real time monitoring of the performance of the model as well as to perform data quality assessments on dynamic data as it is being collected can enable updating of the training data set so that the model may be adapted incrementally to fluctuations of quality and/or statistical distribution of dynamic data. Incremental adaptation of a model reduces the costs involved in repeatedly replacing the model.

As such, and according to some example embodiments, the systems and methods described herein are therefore configured to implement an adaptive oracle-trained learning framework for automatically building and maintaining models that are developed using machine learning algorithms. In embodiments, the framework leverages at least one oracle (e.g., a crowd) for automatic generation of high-quality training data to use in deriving a model. Once a model is trained, the framework monitors the performance of the model and, in embodiments, leverages active learning and the oracle to generate feedback about the changing data for modifying training data sets while maintaining data quality to enable incremental adaptation of the model.

Particular embodiments of the subject matter described in this specification can be implemented so as to realize one or more of the following advantages. The framework is designed to provide high-quality data for less cost than current state of the art machine learning algorithms/processes) across many real-world data sets. No initial training/testing phase is needed to generate a model. No expert human involvement is needed to initially construct and over time maintain the training set and retrain the model. The framework continues to provide high quality output data even if the input data change, since the framework determines how and when to adjust the training data set for incremental re-training of the model, and the framework can rely on verified data from an oracle (e.g., crowd sourced data) while the model is being re-trained. The framework has the ability to utilize any high-quality/oracle-provided data, regardless of how the data was generated (e.g., the framework can make use of data that was not collected as part of the training process, such as a separate process in an organization using an oracle to collect correct categories for business).

There is a declarative framework/architecture for clear definition of the end goal for the output data. The framework enables end-users to declare exactly what they want (i.e., high-quality data) without having to understand how to produce such data. The system takes care of not only training the model transparently (as described above), but also deciding for every input data instance if the system should get the answer from the oracle or from a model. All of the details of machine learning models and the accessing of an oracle (e.g., crowd-sourcing) are hidden from the user—the system may not even utilize a full-scale machine learning model or an oracle as long as it can meet its quality requirements.

Figure 1:
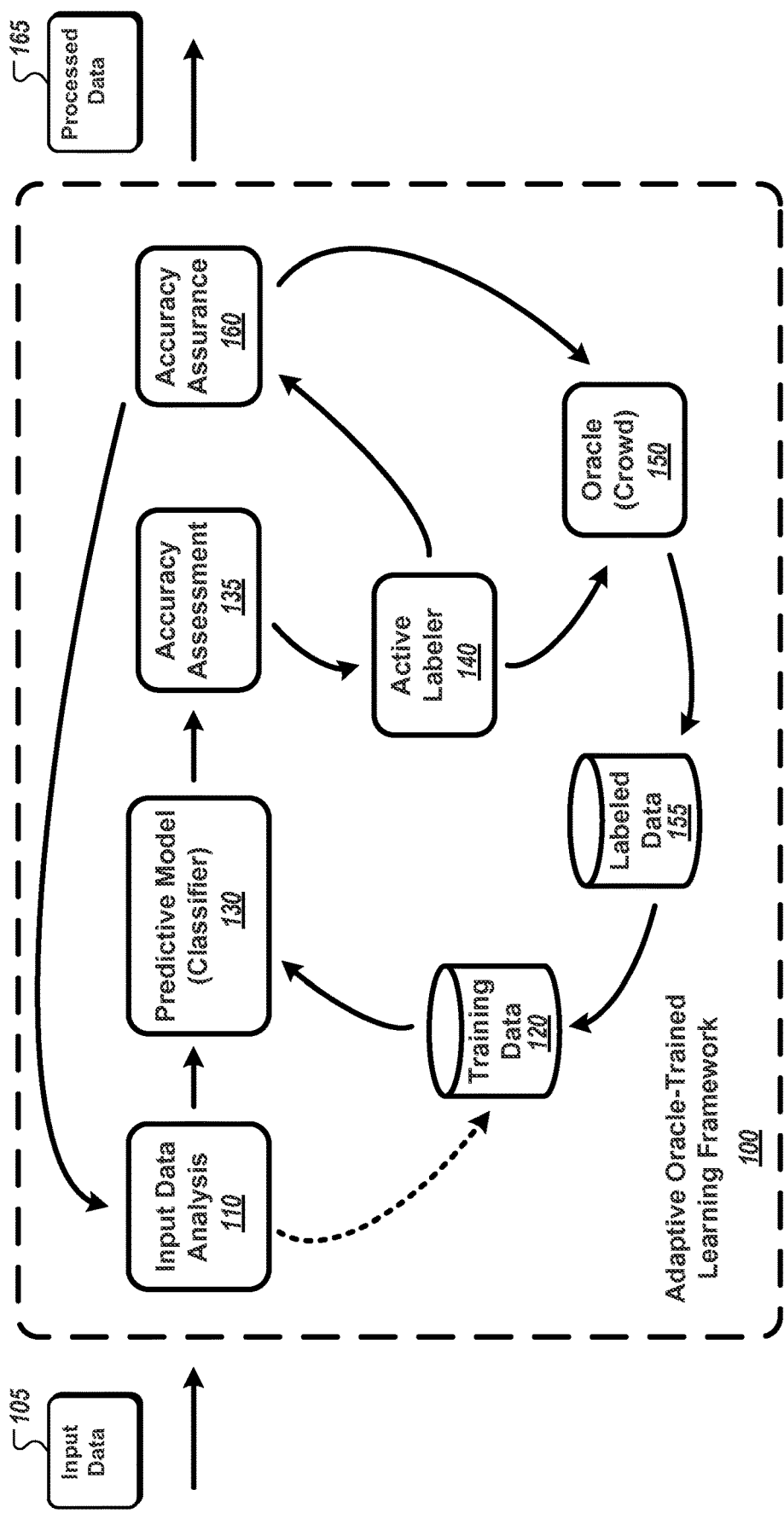
FIG. 1 illustrates a first embodiment of an example system that can be configured to implement an adaptive oracle-trained learning framework for automatically building and maintaining a predictive machine learning model in accordance with some embodiments discussed herein.

FIG. 1 illustrates a first embodiment of an example system that can be configured to implement an adaptive oracle-trained learning framework 100 for automatically building and maintaining a predictive machine learning model. In embodiments, an adaptive oracle-trained learning framework 100 comprises a predictive model 130 (e.g., a classifier) that has been generated using machine learning based on a set of training data 120, and that is configured to generate a judgment about unlabeled input data 105 in response to receiving a feature representation of the input data 105; an input data analysis component 110 for generating a feature representation of the input data 105; an accuracy assessment component 135 for providing an estimated assessment of the accuracy of the judgment of the input data and/or the quality of the input data 105; an active labeler 140 to facilitate the generation and maintenance of optimized training data 120 by identifying possible updates to the training data 120; at least one oracle 150 (e.g., a crowd, a flat file of data verification results previously received from one or more oracles, and/or data verification software) for providing a verified true label for input data 105 identified by the active labeler 140; a labeled data reservoir 155 for storing input data 105 that have received true labels from the oracle 150; and an accuracy assurance component 160 for determining whether the system output processed data 165 satisfies an accuracy threshold.

In embodiments, the predictive model 130 is a trainable model that is derived from the training data 120 using supervised learning. An exemplary trainable model (e.g., a trainable classifier) is adapted to represent a particular task (e.g., a binary classification task in which a classifier model returns a judgment as to which of two groups an input data instance 105 most likely belongs) using a set of training data 120 that consists of examples of the task being modeled. Referring to the exemplary binary classification task, each training example in a training data set from which the classifier is derived may represent an input to the classifier that is labeled representing the group to which the input data instance belongs.

Supervised learning is considered to be a data-driven process, because the efficiency and accuracy of deriving a model from a set of training data is dependent on the quality and composition of the set of training data. As discussed previously, obtaining a set of accurately distributed, high-quality training data instances typically is difficult, time-consuming, and/or expensive. For example, the training data set examples for a classification task should be balanced to ensure that all class labels are adequately represented in the training data. Credit card fraud detection is an example of a classification task in which examples of fraudulent transactions may be rare in practice, and thus verified instances of these examples are more difficult to collect for training data.

In some embodiments, an initial predictive model and a high-quality training data set used to derive the model via supervised learning may be generated automatically within an adaptive oracle-trained learning framework (e.g., framework 100) by processing a stream of unlabeled dynamic data.

Figure 2:
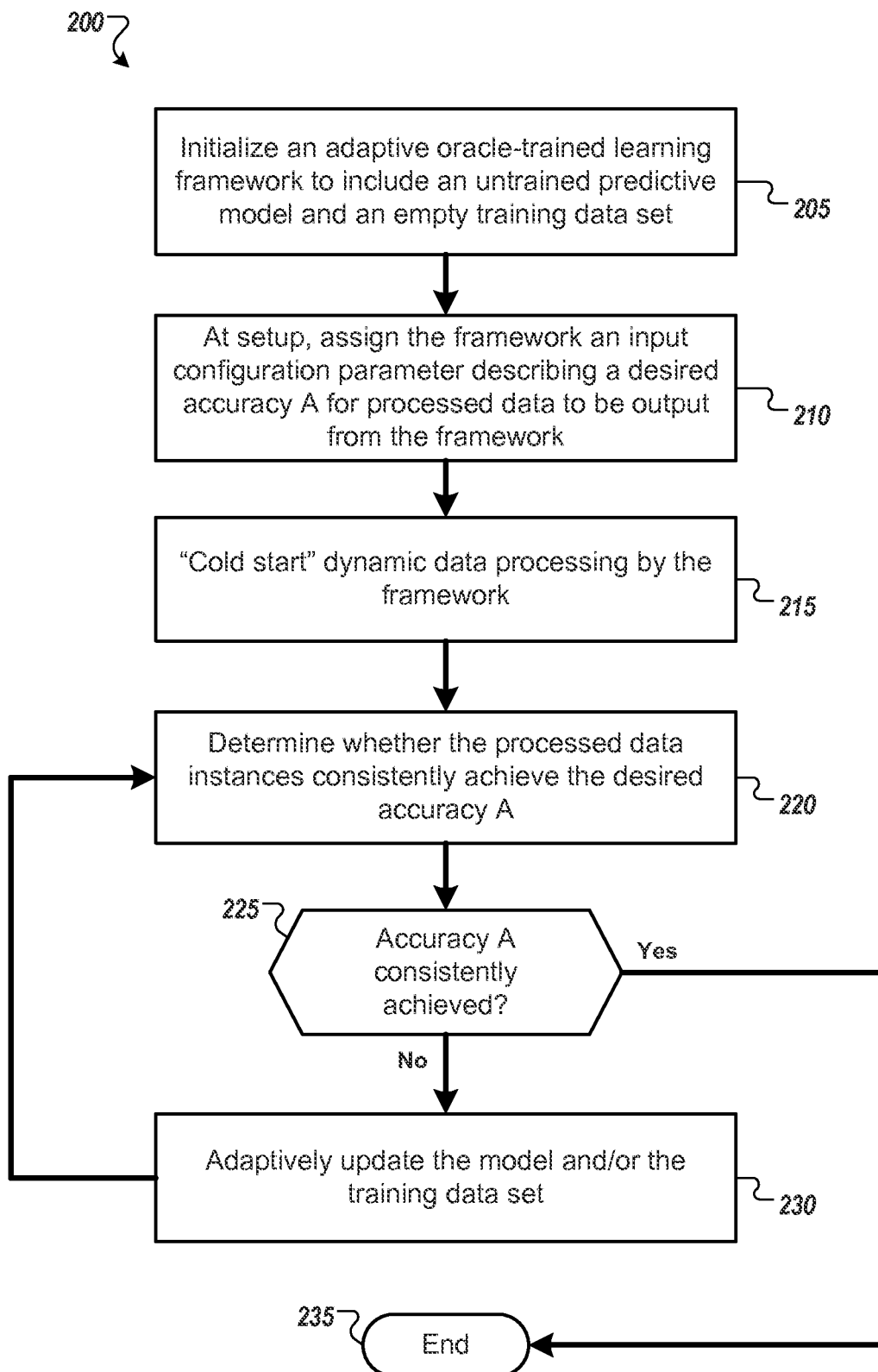
FIG. 2 is a flow diagram of an example method for automatically generating an initial predictive model and a high-quality training data set used to derive the model within an adaptive oracle-trained learning framework in accordance with some embodiments discussed herein.

FIG. 2 is a flow diagram of an example method 200 for automatically generating an initial predictive model and a high-quality training data set used to derive the model within an adaptive oracle-trained learning framework. For convenience, the method 200 will be described with respect to a system that includes one or more computing devices and performs the method 200. Specifically, the method 200 will be described with respect to processing of dynamic data by an adaptive oracle-trained learning framework 100.

In embodiments, a framework 100 is configured initially 205 to include an untrained predictive model 130 and an empty training data set 120. In some embodiments, at framework setup, the framework 100 is assigned 210 an input configuration parameter describing a desired accuracy A for processed data 165 to be output from the framework 100. In some embodiments, the desired accuracy A may be a minimum accuracy threshold to be satisfied for each processed data instance 165 to be output from the framework while, in some alternative embodiments, the desired accuracy A may be an average accuracy to be achieved for a set of processed data 165. The values chosen to describe the desired accuracy A for sets of processed data across various embodiments may vary.

In some embodiments, an initially configured adaptive oracle-trained learning framework 100 that includes an untrained model and empty training data set may be "cold started" 215 by streaming unlabeled input data instances 105 into the system for processing. The model 130 and training data 120 are then adaptively updated 230 by the framework 100 until the processed data instances 165 produced by the model 130 consistently achieve 225 the desired accuracy A as specified by the single input configuration parameter (i.e., the process ends 235 when the system reaches a "steady state").

In some alternative embodiments, one or more high-quality initial training data sets may be generated automatically from a pool of unlabeled data instances. In some embodiments, the unlabeled data instances are dynamic data that have been collected previously from at least one data stream during at least one time window. In some embodiments, the collected data instances are multi-dimensional data, where each data instance is assumed to be described by a set of attributes (i.e., features hereinafter). In some embodiments, the input data analysis component 110 performs a distribution-based feature analysis of the collected data. In some embodiments, the feature analysis includes clustering the collected data instances into homogeneous groups across multiple dimensions using an unsupervised learning approach that is dependent on the distribution of the input data as described, for example, in U.S. patent application Ser. No. 14/038,661 entitled "Dynamic Clustering for Streaming Data," filed on Sep. 16, 2013, and which is incorporated herein in its entirety. In some embodiments, the clustered data instances are sampled uniformly across the different homogeneous groups, and the sampled data instances are sent to an oracle 150 (as shown in FIG. 1) for labeling.

Figure 3:
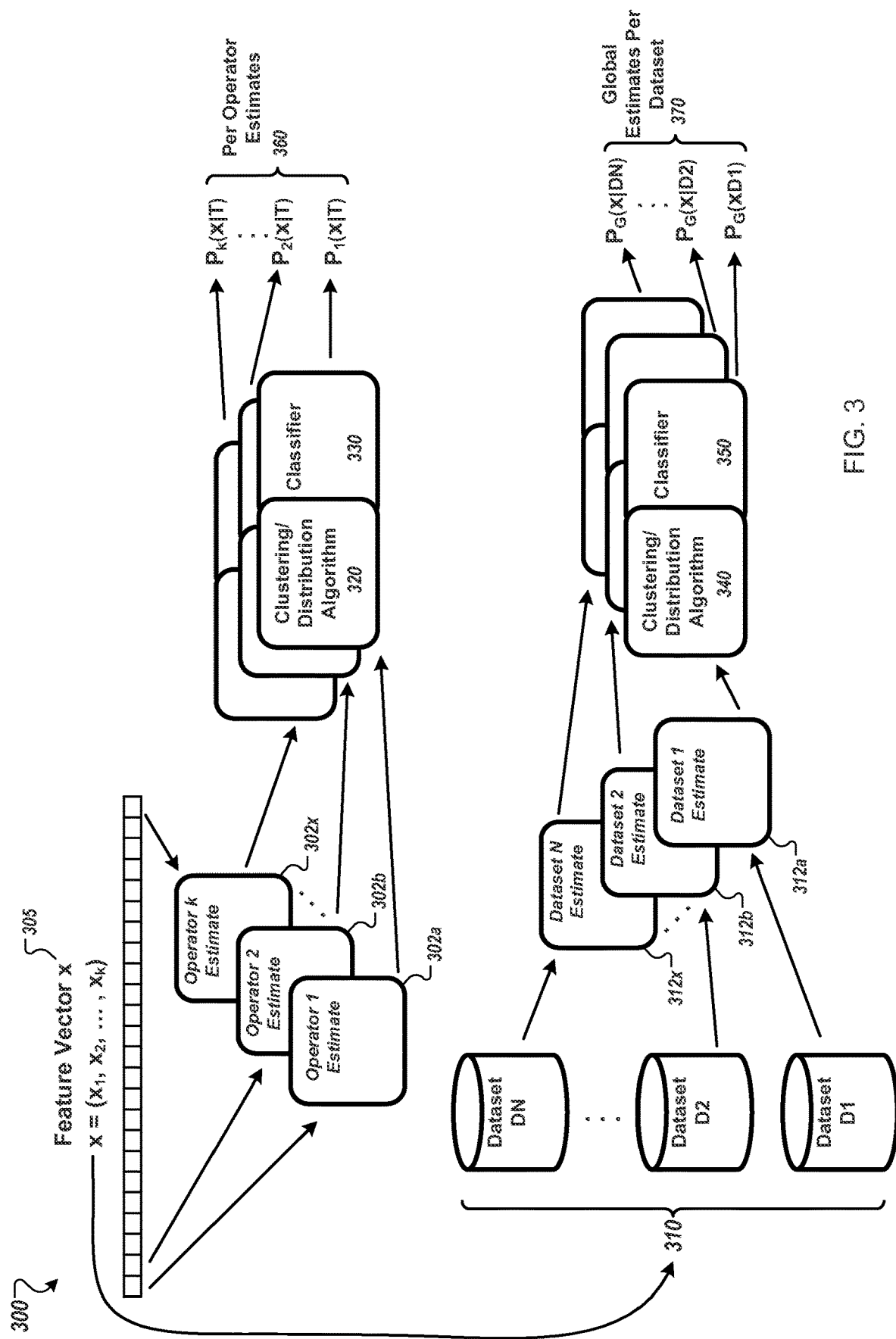
FIG. 3 illustrates an exemplary process for automatically determining whether an input multi-dimensional data instance is an optimal choice for labeling and inclusion in at least one initial training data set using an adaptive oracle-trained learning framework in accordance with some embodiments discussed herein.
Figure 4:
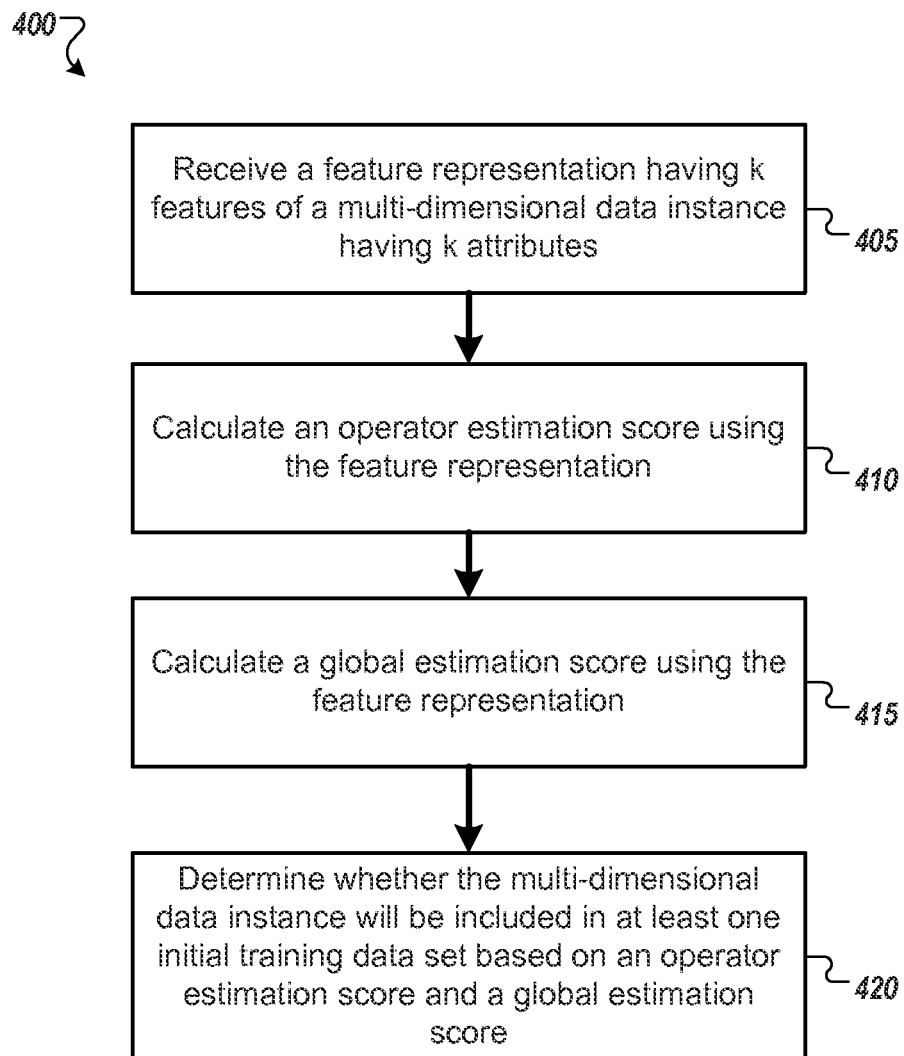
FIG. 4 is a flow diagram of an example method for determining whether an input multi-dimensional data instance is an optimal choice for labeling and inclusion in at least one initial training data set in accordance with some embodiments discussed herein.

FIGS. 3 and 4 respectively illustrate and describe a flowchart for an exemplary method 400 for automatically determining whether an input multi-dimensional data instance is an optimal choice for labeling and inclusion in at least one initial training data set using an adaptive oracle-trained learning framework 100. The depicted method 400 is described with respect to a system that includes one or more computing devices and performs the method 400.

In embodiments, the system receives an input multi-dimensional data instance having k attributes 405. Determining whether an input multi-dimensional data instance is a preferred choice for labeling and inclusion in at least one initial training data set 420 is based in part on an operator estimation score and/or on a global estimation score assigned to the data instance.

Turning to FIG. 3 for illustration, in embodiments, an input multi-dimensional data instance having k attributes is represented by a feature vector x 305 having k elements ($x_1$, $x_2$, . . . , $x_k$), where each element in feature vector x represents the value of a corresponding attribute. Each of the elements is assigned to a particular cluster/distribution of the corresponding attribute using a clustering/distribution algorithm 320 (e.g., dynamic clustering as described in U.S. patent application Ser. No. 14/038,661).

In embodiments, an operator estimate 302 is calculated 410 (as shown in FIG. 4) for each feature. An operator represents a single data cleaning manipulation action applied to a feature. Each operator (e.g., normalization) has at most one statistical model to power its cleaning of the data. In some embodiments, an operator estimate 302 may include multiple operators chained together.

Using an input from a clustering/distribution algorithm 320 respectively associated with each operator estimate, a classifier 330, implementing a per operator estimator trained on the distribution, then determines a per operator estimate confidence value estimating probability $P_n(x|T)$, a probability based on the operator estimate n that the feature vector x belongs to the cluster/distribution T of multi-dimensional data instance feature vectors to which it has been assigned. The data instance is assigned an operator estimation score representing the values of the set of per operator estimates 360. For example, referring to the exemplary binary classification task, a higher operator estimation score indicates that the data instance would be assigned to one of the two classes by a binary classifier with a greater degree of confidence/certainty because the data instance is at a greater distance from the decision boundary of the classification task. Conversely, a lower operator estimation score indicates that the assignment of the data instance to one of the classes by the binary classifier would be at a lower degree of confidence/certainty because the data instance is located close to or at the decision boundary for the classification task.

In some embodiments, the data instance, represented by feature vector x 305, is assigned to each of a group of N global datasets 310 containing data instances of the same type as the input data instance, and an estimated distribution 312 is calculated for each dataset. In some embodiments, the group of N global datasets 310 have varying timeline-based sizes (e.g., each dataset respectively represents a set of data instances collected during a weekly, monthly, or quarterly time window). Using an input from a clustering/distribution algorithm 340 respectively associated with each of the group of datasets, a classifier 350 implementing a per dataset estimator trained on each distribution determines a per dataset global estimate confidence value estimating probability $P_G(x|DY)$, a probability that the input data instance belongs to the global distribution represented by its associated dataset Y. The input data instance is assigned 415 a global estimation score representing the values of the set of per dataset global estimates 370. A data instance having a higher global estimation score is more likely to belong to a global distribution of data instances of the same type.

Returning to FIG. 1, once the model 130 is derived, in some embodiments, the framework 100 may further optimize the initial training data 120 by processing the training data set examples using the model 130, monitoring the performance of the model 130 during the processing, and then adjusting the input data feature representation and/or the composition and/or distribution of the training dataset based on an analysis of the model's performance.

In some embodiments, a predictive model 130 and training data 120 deployed within an adaptive oracle-trained learning framework 100 for processing dynamic data may be updated incrementally in response to changes in the quality and/or characteristics of the dynamic data to achieve optimal processing of newly received input data 105. In embodiments, an input data instance 105 may be selected by the framework as a potential training example based on an accuracy assessment determined from the model output generated from processing the input data instance 105 and/or attributes of the input data instance. Selected data instances receive true labels from at least one oracle 150, and are stored in a labeled data reservoir 155. In embodiments, the training data 120 are updated using labeled data selected from the labeled data reservoir 155.

Figure 5:
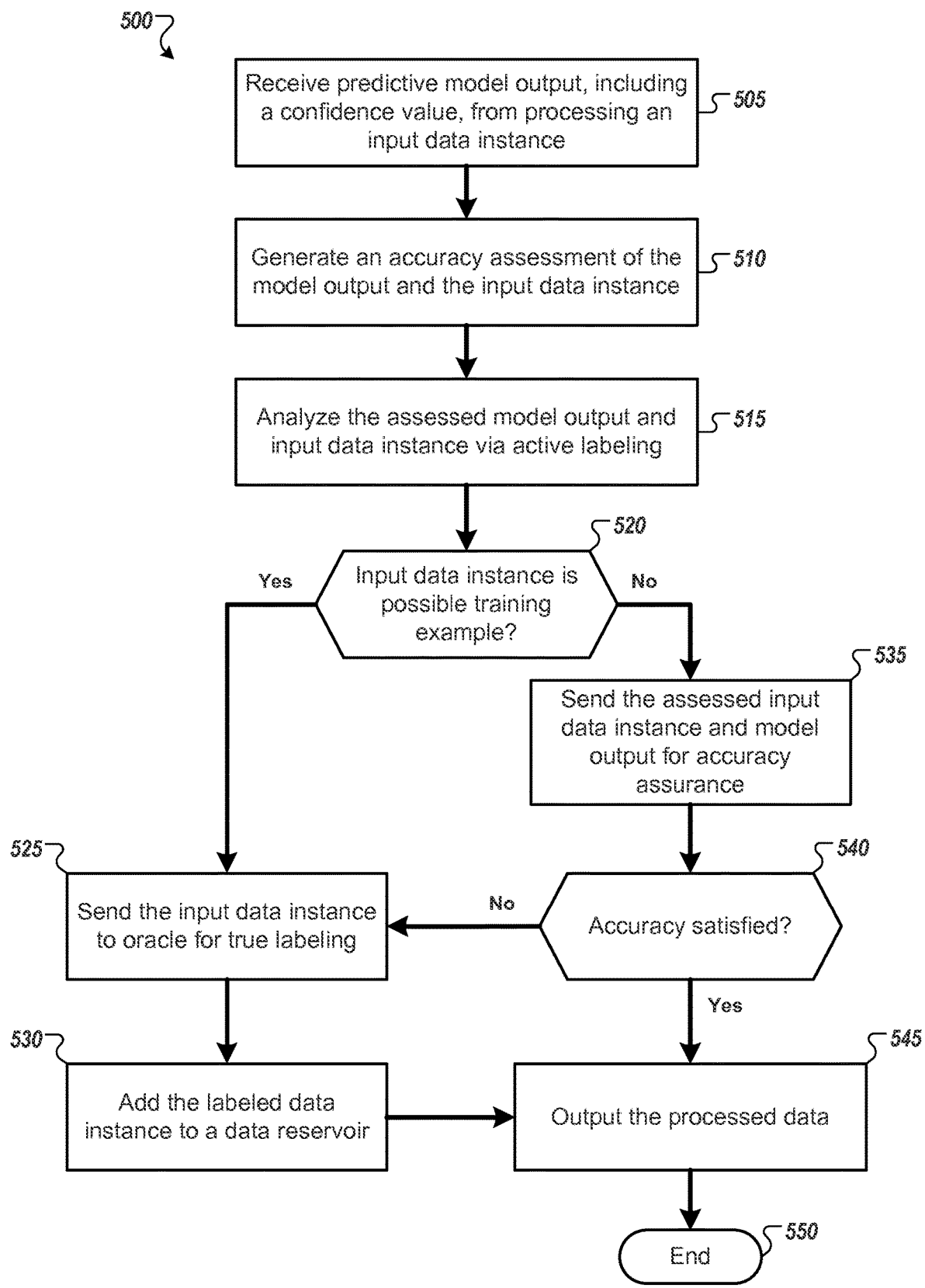
FIG. 5 is a flow diagram of an example method 500 for adaptive processing of input data by an adaptive learning framework in accordance with some embodiments discussed herein.

FIG. 5 is a flow diagram of an example method 500 for adaptive processing of input data by an adaptive learning framework. The method 500 is described with respect to a system that includes one or more computing devices that process dynamic data by an adaptive oracle-trained learning framework 100. For clarity and without limitation, method 500 will be described for an exemplary system in which the predictive model 130 is a trainable classifier.

In embodiments, the system receives 505 model output (i.e., a judgment) from a classifier model (e.g., model 130) that has processed an input data instance 105. Exemplary model output may be a predicted label representing a category/class to which the input data instance is likely to belong. In some embodiments, the judgment includes a confidence value that represents the certainty of the judgment. For example, if the input data instance is very different from any of the training data instances, the model output that is generated from that input data has a low confidence. The confidence value may be defined by any well-known distance metric (e.g., Euclidean distance, cosine, Jaccard distance). In some embodiments, an associated judgment confidence value may be a confidence score.

Referring to the example in which the classification task is a binary classification task, the judgment may be based on the model performing a mapping of the input data instance feature set into a binary decision space representing the task parameters, and the associated judgment confidence value may be a confidence score representing the distance in the binary decision space between the mapping of the data instance feature set and a decision boundary at the separation of the two classes in the decision space. A mapping located at a greater distance from the decision boundary may be associated with a higher confidence score, representing a class assignment predicted at a greater confidence/certainty. Conversely, a mapping that is located close to the decision boundary may be associated with a lower confidence score, representing a class assignment predicted at a lower confidence/certainty.

In embodiments, the system executes 510 an accuracy assessment of the model output and/or the input data instance quality. In some embodiments, the accuracy assessment is an accuracy value representing the accuracy of the model judgment.

In some embodiments, accuracy assessment may include one or a combination of model-dependent and model-independent analytics. In some embodiments in which the model judgment includes a confidence score, accuracy assessment may include that confidence score directly. In some embodiments, a second predictive model may be used to estimate the framework model accuracy on a per-instance level. For example, a random sample of data instances labeled by the framework model can be sent to the oracle for verification, and that sample then can be used as training data to train a second model to predict the probability that the framework model judgment is correct.

In some embodiments, accuracy assessment is implemented by a quality assurance component 160 to generate an aggregate/moving window estimate of accuracy. In some embodiments, the quality assurance component 160 is configured as a dynamic data quality assessment system described, for example, in U.S. patent application Ser. No. 14/088,247 entitled "Automated Adaptive Data Analysis Using Dynamic Data Quality Assessment," filed on Nov. 22, 2013, and which is incorporated herein in its entirety. An exemplary dynamic quality assessment system is described in detail with reference to FIG. 10 and method 700 of FIG. 7.

In embodiments, the system analyzes 515 the assessed model output and input data instance by determining whether the input data instance should be selected for potential inclusion in the training data set 120. In an instance in which the input data instance is selected 520 as a possible training example, the system sends the instance to an oracle for true labeling.

In some embodiments, the analysis ("active labeling" hereinafter) includes active learning. Active learning, as described, for example, in Settles, Burr (2009), "Active Learning Literature Survey", Computer Sciences Technical Report 1648, University of Wisconsin—Madison, is a semi-supervised learning process in which the distribution of the training data set instances can be adjusted to optimally represent a machine learning problem. For example, a machine-learning algorithm may achieve greater accuracy with fewer training examples if the selected training data set instances are instances that will provide maximum information to the model about the problem. Referring to the trainable classifier example, data instances that may provide maximum information about a classification task are data instances that result in mappings in decision space that are closer to the decision boundary. In some embodiments, these data instances may be identified automatically through active labeling analysis because their judgments are associated with lower confidence scores, as previously described.

Additionally and/or alternatively, in some embodiments, the determination of whether the input data instance should be selected for potential inclusion in the training data set 120 may include a data quality assessment. In some embodiments, active labeling analysis may be based on a combination of model prediction accuracy and data quality.

In some embodiments, in response to receiving a labeled data instance from the oracle, the system stores 530 the labeled data instance in a labeled data reservoir 155, from which new training data instances may be selected for updates to training data 120. In some embodiments, the labeled data reservoir grows continuously as labeled data instances are received by the system and then stored.

In embodiments, the system outputs 545 the labeled data instance before the process ends 550. The true label assigned to the data instance by the oracle ensures the accuracy of the output, regardless of the outcome of the accuracy assessment of the model performance and/or the input data instance quality.

In an instance in which the input data instance is not selected 520 as a possible training example, in embodiments, the system sends 535 the assessed input data instance and the model output for accuracy assurance. In some embodiments, as previously described, accuracy assurance may include determining whether the assessed input data instance and the model output satisfy a desired accuracy A that has been received as a declarative configuration parameter by the system.

In an instance in which the desired accuracy is satisfied 540, the system outputs 545 the processed data instance and the process ends 550.

In an instance in which the desired accuracy is not satisfied 540, in embodiments, the system sends 525 the input data instance to the oracle for true labeling. In some embodiments, the labeled data instance is added 530 to the data reservoir and then output 545 before the process ends 550, as previously described.

Figure 6:
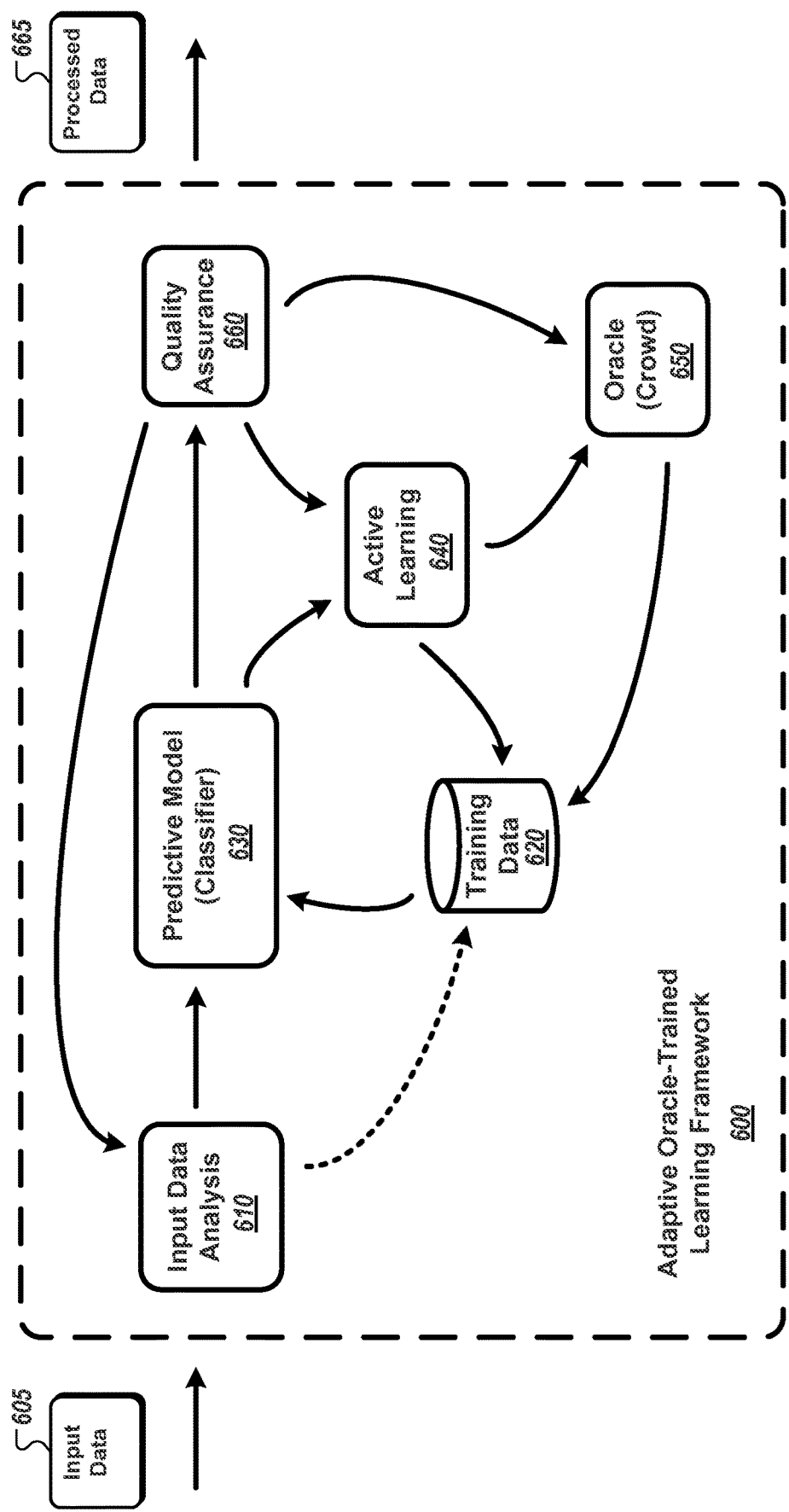
FIG. 6 illustrates a second embodiment of an example system that can be configured to implement an adaptive oracle-trained learning framework for automatically building and maintaining a predictive machine learning model in accordance with some embodiments discussed herein.

FIG. 6 illustrates a second embodiment of an example system that can be configured to implement an adaptive oracle-trained learning framework 600 for automatically building and maintaining a predictive machine learning model. In embodiments, an adaptive oracle-trained learning framework 600 comprises a predictive model 630 (e.g., a classifier) that has been generated using machine learning based on a set of training data 620, and that is configured to generate a judgment about the input data 605 in response to receiving a feature representation of the input data 605; an input data analysis component 610 for generating a feature representation of the input data 605 and maintaining optimized, high-quality training data 620; a quality assurance component 660 for assessment of the quality of the input data 605 and of the quality of the judgments of the predictive model 630; an active learning component 640 to facilitate the generation and maintenance of optimized training data 620; and at least one oracle 650 (e.g., a crowd, a flat file of data verification results previously received from one or more oracles, and/or data verification software) for providing a verified quality measure for the input data 605 and its associated judgment.

In embodiments, new unlabeled data instances 605, sharing the particular type of the examples in the training data set 620, are input to the framework 600 for processing by the predictive model 630. For example, in some embodiments, each new data instance 605 may be multi-dimensional data collected from one or more online sources describing a particular business (e.g., a restaurant, a spa), and the predictive model 630 may be a classifier that returns a judgment as to which of a set of categories the business belongs.

In embodiments, the predictive model 630 generates a judgment (e.g., an identifier of a category) in response to receiving a feature representation of an unlabeled input data instance 605. In some embodiments, the feature representation is generated during input data analysis 610 using a distribution-based feature analysis, as previously described. In some embodiments, the judgment generated by the predictive model 630 includes a confidence value. For example, in some embodiments in which the predictive model 630 is performing a classification task, the confidence value included with a classification judgment is a score representing the distance in decision space of the judgment from the task decision boundary, as previously described with reference to FIG. 3. Classification judgments that are more certain are associated with higher confidence scores because those judgments are at greater distances in decision space from the task decision boundary.

In some embodiments, a quality assurance component 660 monitors the quality of the predictive model performance as well as the quality of the input data being processed. The processed data 665 and, in some embodiments, an associated judgment are output from the framework 600 if they are determined to satisfy a quality threshold.

Figure 7:
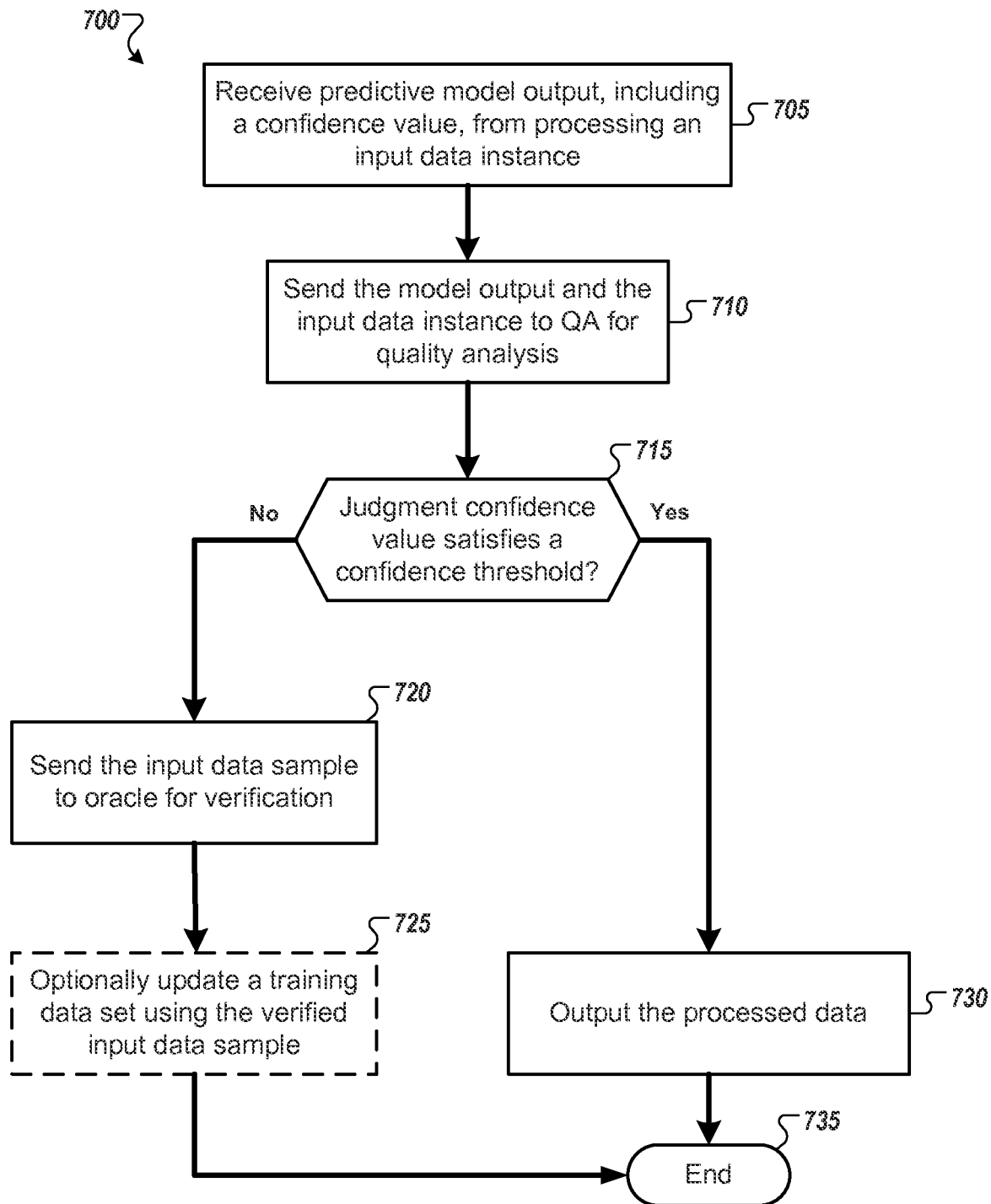
FIG. 7 is a flow diagram of an example method for adaptive maintenance of a predictive model for optimal processing of dynamic data in accordance with some embodiments discussed herein.

FIG. 7 is a flow diagram of an example method 700 for adaptive maintenance of a predictive model for optimal processing of dynamic data. For convenience, the method 700 will be described with respect to a system that includes one or more computing devices and performs the method 700. Specifically, the method 700 will be described with respect to processing of dynamic data by an adaptive oracle-trained learning framework 600. For clarity and without limitation, method 700 will be described for an exemplary system in which the predictive model 630 is a trainable classifier.

In embodiments, the system receives 705 a classification judgment about an input data instance from the classifier. The judgment includes a confidence value that represents the certainty of the judgment. In some embodiments, the confidence value included with a classification judgment is a score representing the distance in decision space of the judgment from the task decision boundary, as previously described with reference to FIG. 3.

In embodiments, the system sends 710 the judgment and the input data instance to a quality assurance component 660 for quality analysis. In some embodiments, quality analysis includes determining 715 whether the judgment confidence value satisfies a confidence threshold.

In an instance in which the judgment confidence value satisfies the confidence threshold and the data satisfy a quality threshold, the system outputs 730 the data processed by the modeling task and the process ends 735.

In an instance in which the judgment confidence value does not satisfy the confidence threshold, the system sends 720 the input data sample to an oracle for verification. In some embodiments, verification by the oracle may include correction of the data, correction of the judgment, and/or labeling the input data. In response to receiving the verified data from the oracle, the system optionally may update the training data 620 using the verified data before the process ends 735. In some embodiments, updating the training data may be implemented using the quality assurance component 660 and/or the active learning component 640, which both are described in more detail with reference to FIGS. 10-12.

In some embodiments, the training data set 620 is updated continuously as new input data are processed, so that the training data reflect optimal examples of the current data being processed. The training data examples thus are adapted to fluctuations in quality and composition of the dynamic data, enabling the predictive model 630 to be re-trained. In some embodiments, the model 630 may be re-trained using the current training data set periodically or, alternatively, under a re-training schedule. In this way, a predictive model can maintain its functional effectiveness by adapting to the dynamic nature of the data being processed. Incrementally adapting an existing model is less disruptive and resource-intensive than replacing the model with a new model, and also enables a model to evolve with the dynamic data. In some embodiments, an adaptive oracle-trained learning framework 600 is further configured to perform two sample hypothesis testing (A/B testing, hereinafter) to verify the performance of the predictive model 630 after re-training.

Figure 8:
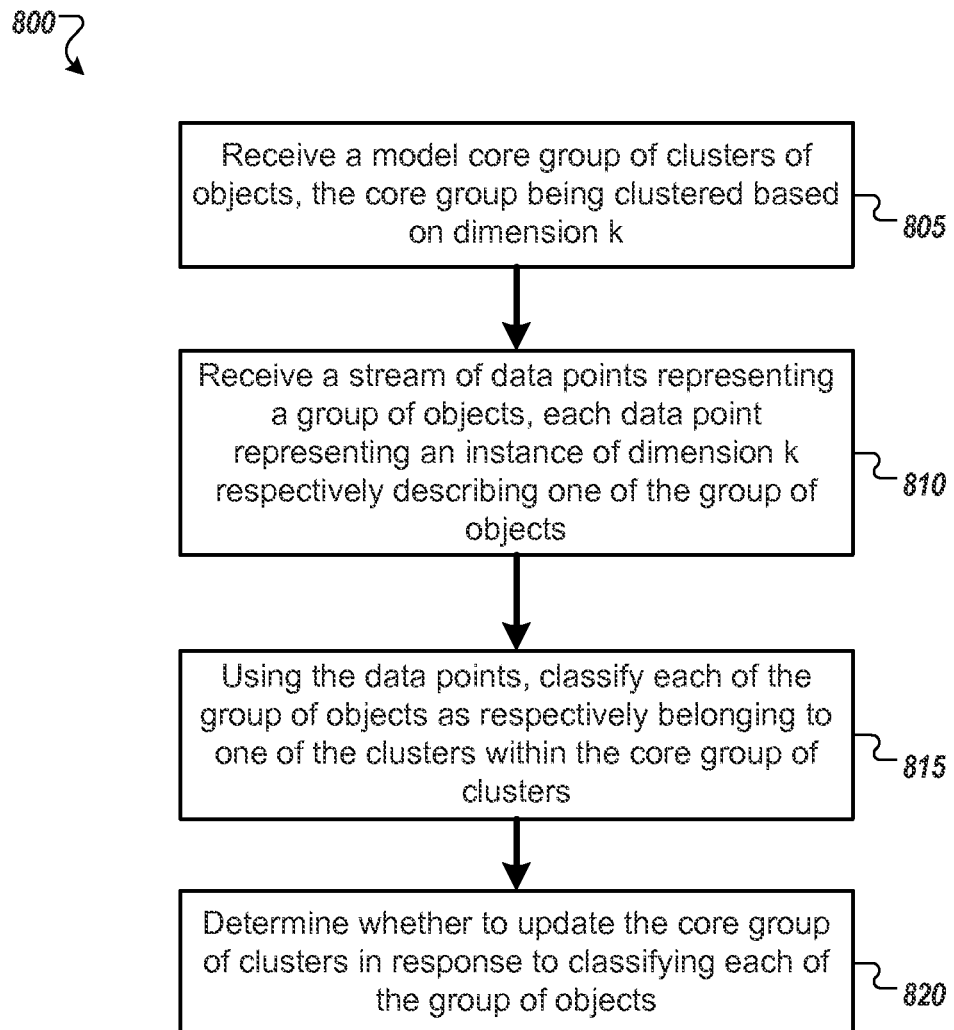
FIG. 8 is a flow diagram of an example method for dynamically updating a model core group of clusters along a single dimension k in accordance with some embodiments discussed herein.
Figure 9:
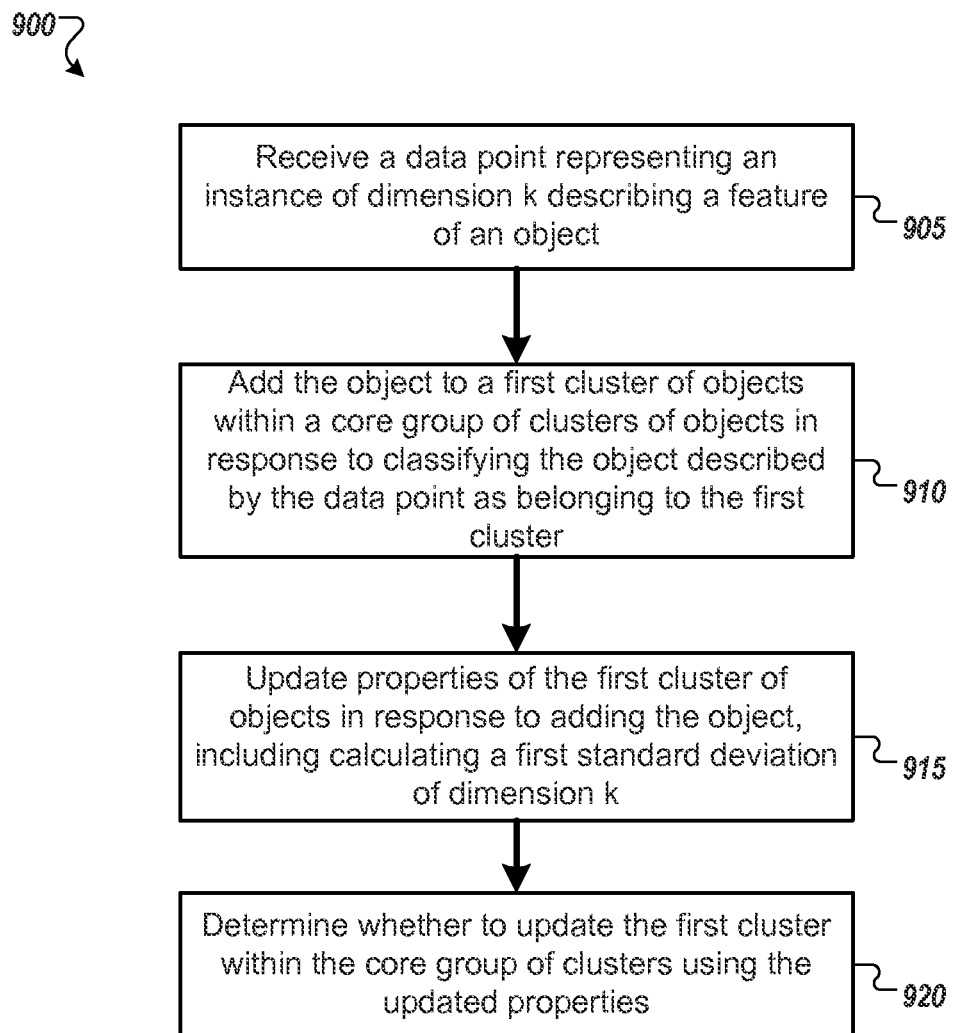
FIG. 9 is a flow diagram of an example method for dynamically updating a cluster along a single dimension k in accordance with some embodiments discussed herein.

In some embodiments, the system performs a new distribution-based feature analysis of the training data 620 in response to the addition of newly labeled data instances. In some embodiments, for example, a new distribution-based feature analysis of the data by dynamic clustering may be performed by the input data analysis component 610 using method 800, a flow chart of which is illustrated in FIG. 8, and using method 900, a flow chart of which is illustrated in FIG. 9. Method 800 and method 900 are described in detail in U.S. patent application Ser. No. 14/038,661.

FIG. 8 is a flow diagram of an example method 800 for dynamically updating a model core group of clusters along a single dimension k. For convenience, the method 800 will be described with respect to a system that includes one or more computing devices and performs the method 800.

In embodiments, the system receives 805 $X_k$, defined as a model core group of clusters 105 of objects based on a clustering dimension k. For example, in embodiments, clustering dimension k may represent a geographical feature of an object represented by latitude and longitude data. In embodiments, the system receives 810 a new data stream $S_k$ representing the objects in $X_k$, where the n-dimensional vector representing each object $O^i$ includes the $k^{th}$ dimension.

In embodiments, the system classifies 815 each of the objects represented in the new data stream 125 as respectively belonging to one of the clusters within $X_k$. In some embodiments, an object is classified by determining, based on a k-means algorithm, $C_k$, the nearest cluster to the object in the $k^{th}$ dimension. In embodiments, classifying an object includes adding that object to the cluster $C_k$.

In embodiments, the system determines 820 whether to update $X_k$ in response to integrating each of the objects into its respective nearest cluster.

FIG. 9 is a flow diagram of an example method 900 for dynamically updating a cluster along a single dimension k. For convenience, the method 900 will be described with respect to a system that includes one or more computing devices and performs the method 900. Specifically, the method 900 will be described with respect to implementation of steps 815 and 820 of method 800.

In embodiments, the system receives 905 a data point from a new data stream $S_k$ representing $O^i_k$, an instance of clustering dimension k describing a feature of an object being described in new data stream S. For example, in embodiments, the data point may be latitude and longitude representing a geographical feature included in an n-dimensional feature vector describing the object.

In embodiments, the system adds 910 the object to the closest cluster $C_k \in S_k$ for $O^i_k$, and, in response, updates 915 the properties of cluster $C_k$. In embodiments, updating the properties includes calculating $\sigma_k$, the standard deviation of the objects in cluster $C_k$.

In embodiments, the system determines 920 whether to update cluster $C_k$ using its updated properties. In some embodiments, updating cluster $C_k$ may include splitting cluster $C_k$ or merging cluster $C_k$ with another cluster within the core group of clusters. In some embodiments, the system determines 920 whether to update cluster $C_k$ using $\sigma_k$.

In some embodiments, the system may optimize an initial training data set 120 that has been generated from a pool of unlabeled data by implementing method 300 to process the initial training data set 120 using the predictive model 130 generated from the initial training data and updating the training data set 120 based on the quality assessments of the model judgments of the data instances. The system may repeat implementation of method 300 until the entire training data set meets a pre-determined quality threshold.

In some embodiments, the quality assurance component 160 is configured as a dynamic data quality assessment system described, for example, in U.S. patent application Ser. No. 14/088,247 entitled "Automated Adaptive Data Analysis Using Dynamic Data Quality Assessment," filed on Nov. 22, 2013, and which is incorporated herein in its entirety.

Figure 10:
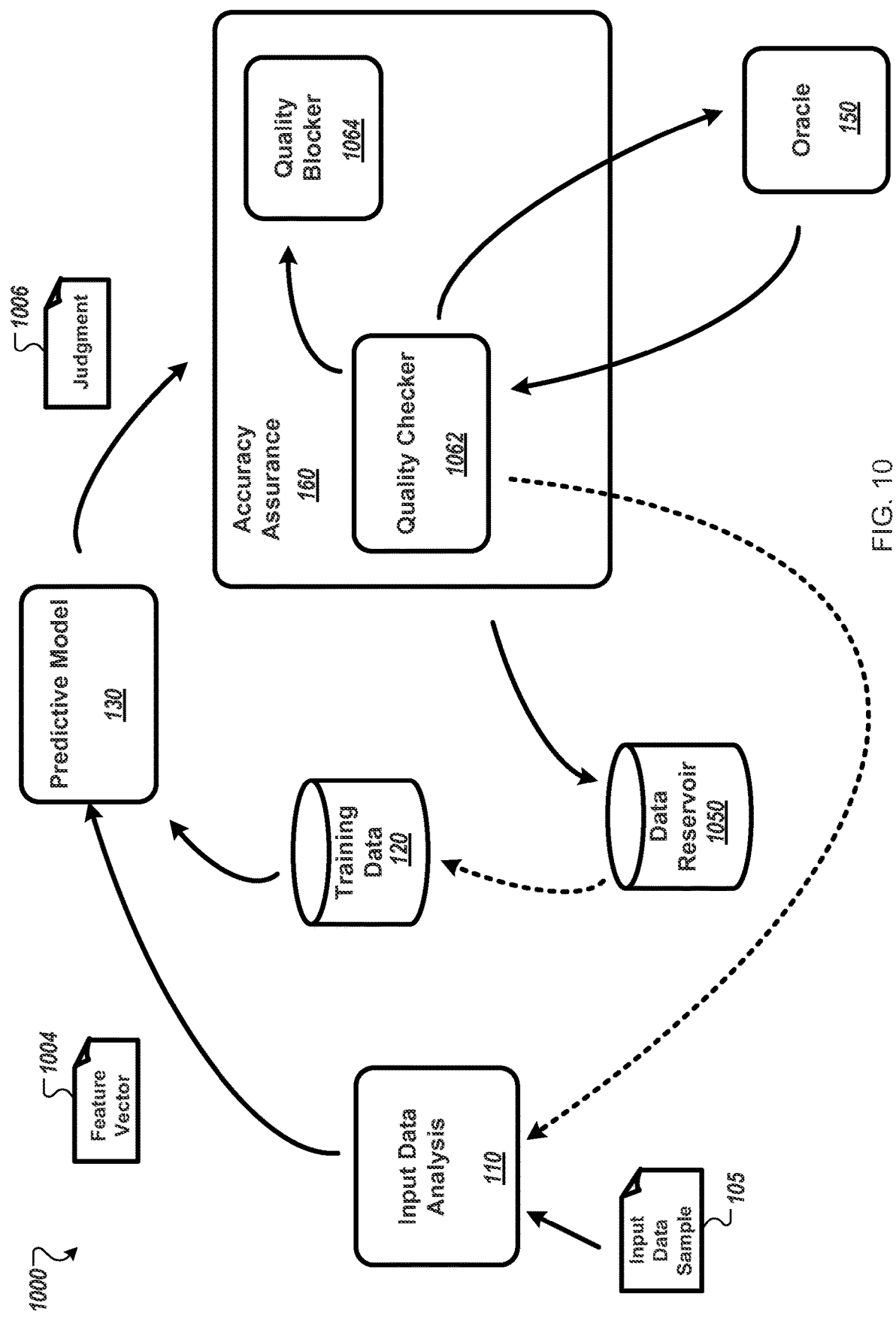
FIG. 10 illustrates a diagram in which an exemplary dynamic data quality assessment system is configured as a quality assurance component within an adaptive oracle-trained learning framework in accordance with some embodiments discussed herein.

FIG. 10 illustrates a diagram 1000, in which an exemplary dynamic data quality assessment system is configured as a quality assurance component 160 within an adaptive oracle-trained learning framework 100, as described in detail in U.S. patent application Ser. No. 14/088,247. The quality assurance component 160 includes a quality checker 1062 and a quality blocker 1064, and maintains a data reservoir 1050 within the framework 100.

Figure 11:
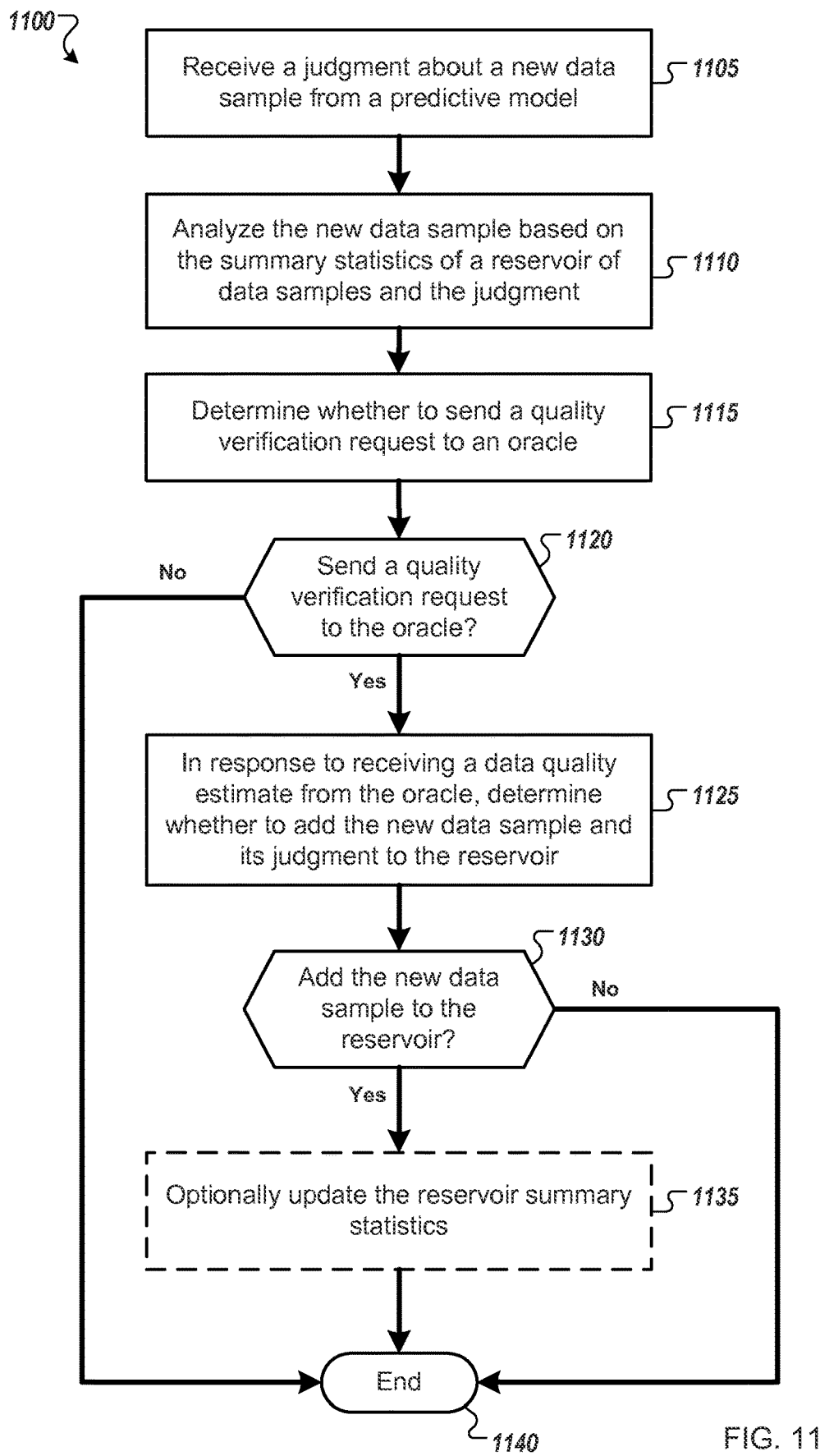
FIG. 11 is a flow diagram of an example method for automatic dynamic data quality assessment of dynamic input data being analyzed using an adaptive predictive model in accordance with some embodiments discussed herein.

In some embodiments, quality analysis performed by the quality assurance component 160 may include determining the effect of data quality fluctuations on the performance of the predictive model 130 generated from the training data 120, identifying input data samples that currently best represent examples of the modeled task, and modifying the training data 120 to enable the model to be improved incrementally by being re-trained with a currently optimal set of training data examples. In some embodiments, dynamic data quality assessment may be performed automatically by the quality assurance component using method 1000, a flow chart of which is illustrated in FIG. 11. Method 1000 is described in detail in U.S. patent application Ser. No. 14/088,247.

FIG. 11 is a flow diagram of an example method 1100 for automatic dynamic data quality assessment of dynamic input data being analyzed using an adaptive predictive model. For convenience, the method 1100 will be described with respect to a system that includes one or more computing devices and performs the method 1100.

For clarity and without limitation, method 1100 will be described for a scenario in which the input data sample is a sample of data collected from a data stream, and in which the predictive model is a trainable classifier, adapted based on a set of training data. In some embodiments, a data cleaning process has been applied to the input data sample. The classifier is configured to receive a feature vector representing a view of the input data sample and to output a judgment about the input data sample.

In embodiments, the system receives 1105 a judgment about an input data sample from a classifier. In some embodiments, the judgment includes a confidence value that represents a certainty of the judgment. For example, in some embodiments, the confidence value may be a score that represents the distance of the judgment from the decision boundary in decision space for the particular classification problem modeled by the classifier. The confidence score is higher (i.e., the judgment is more certain) for judgments that are further from the decision boundary.

As previously described with reference to FIG. 1, in some embodiments, the system maintains a data reservoir of data samples that have the same data type as the input data sample and that have been processed previously by the classifier. In embodiments, the system analyzes 1110 the input data sample in terms of the summary statistics of the data reservoir and/or the judgment. In some embodiments, analysis of the judgment may include comparing a confidence value associated with the judgment to a confidence threshold and/or determining whether the judgment matches a judgment determined previously for the input sample by a method other than the classifier.

In embodiments, the system determines 1115 whether to send a quality verification request for the input data sample to an oracle based on the analysis. For example, in some embodiments, the system may determine to send a quality verification request for the input data sample if the data sample is determined statistically to be an outlier to the data samples in the data reservoir. In another example, the system may determine to send a quality verification request for the input data sample if the judgment is associated with a confidence value that is below a confidence threshold. In a third example, the system may determine to send a quality verification request for the input data sample if the judgment generated by the classifier does not match a judgment generated by another method, even if the confidence value associated with the classifier's judgment is above the confidence threshold.

In an instance in which the system determines 1120 that a quality request will not be sent to the oracle, the process ends 1140.

In an instance in which the system determines 1120 that a quality request will be sent to the oracle, in some embodiments, the system may be configured to send requests to any of a group of different oracles (e.g., a crowd, a flat file of data verification results previously received from one or more oracles, and/or data verification software) and the system may select the oracle to receive the quality verification request based on attributes of the input data sample.

In response to receiving a data quality estimate of the input data sample from the oracle, in embodiments, the system determines 1125 whether to add the input data sample, its associated judgment, and its data quality estimate to the data reservoir. In some embodiments, the determination may be based on whether the input data sample statistically belongs in the data reservoir. Additionally and/or alternatively, the determination may be based on whether the judgment is associated with a high confidence value and/or matches a judgment made by a method different from the classifier (e.g., the oracle).

In an instance in which the system determines 1125 that the new data sample is not to be added to the reservoir, the process ends 1140.

In an instance in which the system determines 1125 that the new data sample is to be added to the reservoir, before the process ends 1140, the system optionally updates summary statistics for the reservoir.

In some embodiments, the generation and maintenance of an optimized training data set 120 for the predictive model 130 component of the framework is facilitated by the active learning component 140. Active learning, as described, for example, in Settles, Burr (2009), "Active Learning Literature Survey", Computer Sciences Technical Report 1648, University of Wisconsin—Madison, is a semi-supervised learning process in which the distribution of the training data set instances can be adjusted to optimally represent a machine learning problem.

Figure 12:
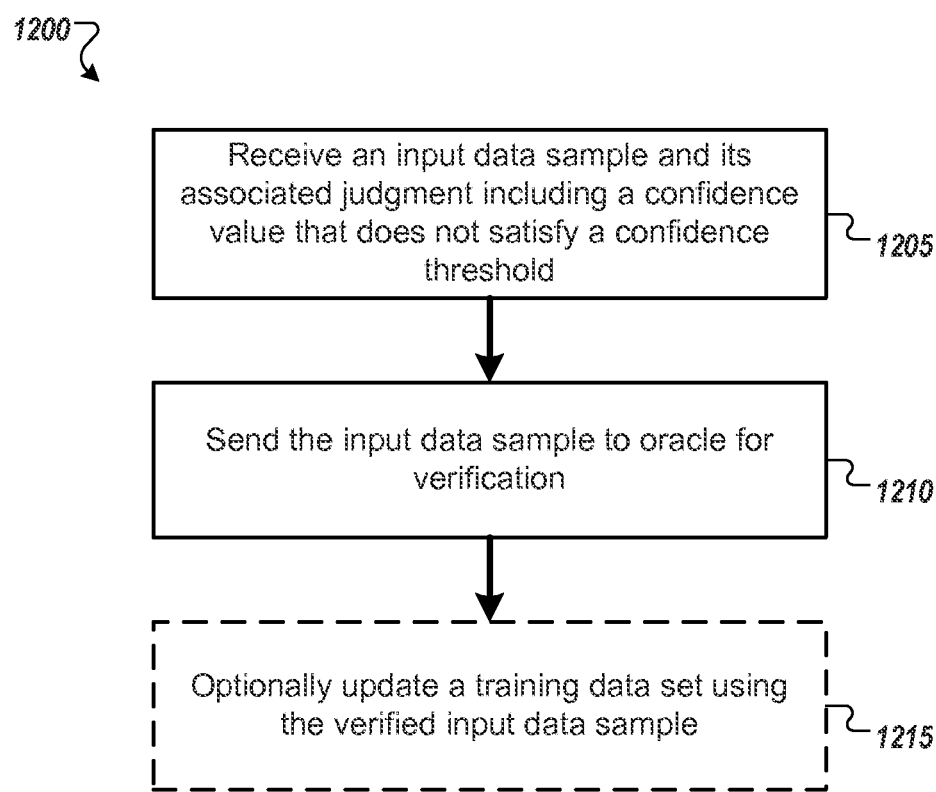
FIG. 12 is a flow diagram of an example method for using active learning for processing potential training data for a machine-learning algorithm in accordance with some embodiments discussed herein.

FIG. 12 is a flow diagram of an example method 1200 for using active learning for processing potential training data for a machine-learning algorithm. For convenience, the method 1200 will be described with respect to a system that includes one or more computing devices and performs the method 1200. Specifically, the method 1200 will be described with respect to processing of dynamic data by the active learning component 140 of an adaptive oracle-trained learning framework 100. For clarity and without limitation, method 1200 will be described for an exemplary system in which the machine-learning algorithm is a trainable classifier.

In embodiments, the system receives 1205 an input data sample and its associated judgment that includes a confidence value determined to not satisfy a confidence threshold.

A machine-learning algorithm may achieve greater accuracy with fewer training labels if the training data set instances are chosen to provide maximum information about the problem. Referring to the classifier example, data instances that provide maximum information about the classification task are data instances that result in classifier judgments that are closer to the decision boundary. In some embodiments, these data instances may be recognized automatically because their judgments are associated with lower confidence scores, as previously described.

In embodiments, the system sends 1210 the input data sample to an oracle for verification. In some embodiments, verification by the oracle may include correction of the data, correction of the judgment, and/or labeling the input data.

In embodiments, the system optionally may update 1215 the training data 120 using the verified data. Thus, the system can leverage the classifier's performance in real time or near real time to adapt the training data set to include a higher frequency of examples that currently result in judgments having the greatest uncertainty.

In embodiments, a dynamic data quality assessment system 160 may complement an active learning component 140 to ensure that any modifications of the training data by adding new samples to the training data set do not result in over-fitting the model to the problem.

FIG. 13 is an illustration 1300 of the different effects of active learning and dynamic data quality assessment on selection of new data samples to be added to an exemplary training data set for a binary classification model. A model (i.e., a binary classifier) assigns a judgment value 1310 to each data point; a data point assigned a judgment value that is close to either 0 or 1 has been determined with certainty by the classifier to belong to one or the other of two classes. A judgment value of 0.5 represents a situation in which the classification decision was not certain; an input data sample assigned a judgment value close to 0.5 by the classifier represents a judgment that is close to the decision boundary 1315 for the classification task.

The dashed curve 1340 represents the relative frequencies of new training data samples that would be added to a training data set for this binary classification problem by an active learning component. To enhance the performance of the classifier in situations where the decision was uncertain, the active learning component would choose the majority of new training data samples from input data that resulted in decisions near the decision boundary 1315.

The solid curve 1330 represents the relative frequencies of new training data samples that would be added to the training data set by dynamic quality assessment. Instead of choosing new training data samples based on the judgment value, in some embodiments, dynamic quality assessment may choose the majority of new training data samples based on whether they statistically belong in the data reservoir. It also may choose to add new training data samples that were classified with certainty (i.e., having a judgment value close to either 0 or 1), but erroneously (e.g., samples in which the judgment result from the classifier did not match the result returned from the oracle).

FIG. 14 shows a schematic block diagram of circuitry 1400, some or all of which may be included in, for example, an adaptive oracle-trained learning framework 100. As illustrated in FIG. 14, in accordance with some example embodiments, circuitry 1400 can include various means, such as processor 1402, memory 1404, communications module 1406, and/or input/output module 1408. As referred to herein, "module" includes hardware, software and/or firmware configured to perform one or more particular functions. In this regard, the means of circuitry 1400 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1404) that is executable by a suitably configured processing device (e.g., processor 1402), or some combination thereof.

Processor 1402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 14 as a single processor, in some embodiments, processor 1402 comprises a plurality of processors. The plurality of processors may be embodied on a single computing device or may be distributed across a plurality of computing devices collectively configured to function as circuitry 1400. The plurality of processors may be in operative communication with each other and may be collectively configured to perform one or more functionalities of circuitry 1400 as described herein. In an example embodiment, processor 1402 is configured to execute instructions stored in memory 1404 or otherwise accessible to processor 1402. These instructions, when executed by processor 1402, may cause circuitry 1400 to perform one or more of the functionalities of circuitry 1400 as described herein.

Whether configured by hardware, firmware/software methods, or by a combination thereof, processor 1402 may comprise an entity capable of performing operations according to embodiments of the present invention while configured accordingly. Thus, for example, when processor 1402 is embodied as an ASIC, FPGA or the like, processor 1402 may comprise specifically configured hardware for conducting one or more operations described herein. Alternatively, as another example, when processor 1402 is embodied as an executor of instructions, such as may be stored in memory 1404, the instructions may specifically configure processor 1402 to perform one or more algorithms and operations described herein, such as those discussed in connection with FIGS. 1-12.

Memory 1404 may comprise, for example, volatile memory, non-volatile memory, or some combination thereof. Although illustrated in FIG. 14 as a single memory, memory 1404 may comprise a plurality of memory components. The plurality of memory components may be embodied on a single computing device or distributed across a plurality of computing devices. In various embodiments, memory 1404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1404 may be configured to store information, data (including analytics data), applications, instructions, or the like for enabling circuitry 1400 to carry out various functions in accordance with example embodiments of the present invention. For example, in at least some embodiments, memory 1404 is configured to buffer input data for processing by processor 1402. Additionally or alternatively, in at least some embodiments, memory 1404 is configured to store program instructions for execution by processor 1402. Memory 1404 may store information in the form of static and/or dynamic information. This stored information may be stored and/or used by circuitry 1400 during the course of performing its functionalities.

Communications module 1406 may be embodied as any device or means embodied in circuitry, hardware, a computer program product comprising computer readable program instructions stored on a computer readable medium (e.g., memory 1404) and executed by a processing device (e.g., processor 1402), or a combination thereof that is configured to receive and/or transmit data from/to another device, such as, for example, a second circuitry 1400 and/or the like. In some embodiments, communications module 1406 (like other components discussed herein) can be at least partially embodied as or otherwise controlled by processor 1402. In this regard, communications module 1406 may be in communication with processor 1402, such as via a bus. Communications module 1406 may include, for example, an antenna, a transmitter, a receiver, a transceiver, network interface card and/or supporting hardware and/or firmware/software for enabling communications with another computing device. Communications module 1406 may be configured to receive and/or transmit any data that may be stored by memory 1404 using any protocol that may be used for communications between computing devices. Communications module 1406 may additionally or alternatively be in communication with the memory 1404, input/output module 1408 and/or any other component of circuitry 1400, such as via a bus.

Input/output module 1408 may be in communication with processor 1402 to receive an indication of a user input and/or to provide an audible, visual, mechanical, or other output to a user. Some example visual outputs that may be provided to a user by circuitry 1400 are discussed in connection with FIG. 1. As such, input/output module 1408 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 1400 is embodied as a server or database, aspects of input/output module 1408 may be reduced as compared to embodiments where circuitry 1400 is implemented as an end-user machine or other type of device designed for complex user interactions. In some embodiments (like other components discussed herein), input/output module 1408 may even be eliminated from circuitry 1400. Alternatively, such as in embodiments wherein circuitry 1400 is embodied as a server or database, at least some aspects of input/output module 1408 may be embodied on an apparatus used by a user that is in communication with circuitry 1400. Input/output module 1408 may be in communication with the memory 1404, communications module 1406, and/or any other component(s), such as via a bus. Although more than one input/output module and/or other component can be included in circuitry 1400, only one is shown in FIG. 14 to avoid overcomplicating the drawing (like the other components discussed herein).

Adaptive learning module 1410 may also or instead be included and configured to perform the functionality discussed herein related to the adaptive learning oracle-based framework discussed above. In some embodiments, some or all of the functionality of adaptive learning may be performed by processor 1402. In this regard, the example processes and algorithms discussed herein can be performed by at least one processor 1402 and/or adaptive learning module 1410. For example, non-transitory computer readable media can be configured to store firmware, one or more application programs, and/or other software, which include instructions and other computer-readable program code portions that can be executed to control each processor (e.g., processor 1402 and/or adaptive learning module 1410) of the components of system 400 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of adaptive oracle-trained learning framework 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1402 and/or adaptive learning module 1410 discussed above with reference to FIG. 14, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method, comprising:
receiving, by a processor, a feature representation of a multi-dimensional data instance having a particular data type and k features, wherein the feature representation includes the k features, each feature of the k features representing a value of a corresponding attribute of the multi-dimensional data instance;
calculating, by a processor and for each feature of the k features, a per operator estimate confidence value to produce a set of k per operator estimate confidence values, each per operator estimate confidence value associated with a unique operator estimate and representing a probability of the feature representation belonging to a specific distribution, each unique operator estimate associated with an operator powered by a statistical model and configured to clean data;
calculating, by a processor, an operator estimation score for the multi-dimensional data instance using the feature representation, the operator estimation score calculated based on the set of k per operator estimate confidence values and calculated using a trained per operator estimator;
calculating, by a processor and for each global data set of a set of n global data sets, a per data set global estimate confidence value to produce a set of n per data set global estimate confidence values, each per data set global estimate confidence value representing a probability of the feature representation belonging to a corresponding global distribution represented by the global data set;
calculating, by a processor, a global estimation score using the feature representation, the global estimation score calculated based on the set of n per data set global estimate confidence values;
updating, by the processor, at least one initial training data set with the multi-dimensional data instance upon determining that the multi-dimensional data instance will be included in the at least one initial training data set based on the operator estimation score and the global estimation score; and
deriving, by the processor, at least one model from the at least one initial training data set.

2. The method of claim 1, wherein an operator represents a single data cleaning manipulation action based on a particular statistical model.

3. The method of claim 1, wherein an operator estimate includes multiple operators chained together.

4. The method of claim 1, wherein calculating the global estimation score comprises:
assigning the multi-dimensional data instance to each of a group of n global data sets, wherein each global data set includes data instances having the particular type, and wherein each of the global data sets respectively represents a set of data instances that were collected during a corresponding time window within a group of pre-defined time windows;
generating a set of n per data set global estimate confidence values, each per data set global estimate confidence value being associated with a corresponding global data set; and
calculating the global estimation score using the set of n per data set global estimate confidence values.

5. The method of claim 4, wherein generating a data set global estimate confidence value for a dataset comprises:
generating, using a classifier trained on the data set distribution, a per data set global estimate confidence value by estimating a probability that the multi-dimensional data instance belongs to the global distribution of the data set.

6. The method of claim 1, wherein the feature representation is generated automatically from a pool of unlabeled data instances using a distribution-based feature analysis.

7. The method of claim 6, wherein the distribution-based feature analysis is dynamic clustering.

8. A computer program product, stored on a non-transitory computer readable medium, comprising instructions that when executed on one or more computers cause the one or more computers to:
receive a feature representation of a multi-dimensional data instance having a particular data type and k features, wherein the feature representation includes the k features, each feature of the k features representing a value of a corresponding attribute of the multi-dimensional data instance;
calculate, for each feature of the k features, a per operator estimate confidence value to produce a set of k per operator estimate confidence values, each per operator estimate confidence value associated with a unique operator estimate and representing a probability of the feature representation belonging to a specific distribution, each unique operator estimate associated with an operator powered by a statistical model and configured to clean data;

calculate an operator estimation score for the multi-dimensional data instance using the feature representation, the operator estimation score calculated based on the set of k per operator estimate confidence values and calculated using a trained operator estimator;

calculate, for each global data set of a set of n global data sets, a per data set global estimate confidence value to produce a set of n per data set global estimate confidence values, each per data set global estimate confidence value representing a probability of the feature representation belonging to a corresponding global distribution represented by the global data set;

calculate a global estimation score for the multi-dimensional data instance using the feature representation, wherein calculating the global estimation score is based on the set of n per data set global estimate confidence values;

update at least one initial training data set with the multi-dimensional data instance upon determining that the multi-dimensional data instance will be included in the at least one initial training data set based on the operator estimation score and the global estimation score; and derive at least one model from the at least one initial training data set.

9. The computer program product of claim 8, wherein an operator represents a single data cleaning manipulation action based on a particular statistical model.

10. The computer program product of claim 8, wherein an operator estimate includes multiple operators chained together.

11. The computer program product of claim 8, wherein calculating the global estimation score comprises:

assigning the multi-dimensional data instance to each of a group of n global data sets, wherein each global data set includes data instances having the particular type, and wherein each of the global data sets respectively represents a set of data instances that were collected during a corresponding time window within a group of pre-defined time windows;

generating a set of n per data set global estimate confidence values, each per data set global estimate confidence value being associated with a corresponding global data set; and calculating the global estimation score using the set of n per data set global estimate confidence values.

12. The computer program product of claim 11, wherein generating a data set global estimate confidence value for a dataset comprises:

generating, using a classifier trained on the data set distribution, a per data set global estimate confidence value by estimating a probability that the multi-dimensional data instance belongs to the global distribution of the data set.

13. The computer program product of claim 8, wherein the feature representation is generated automatically from a pool of unlabeled data instances using a distribution-based feature analysis.

14. The computer program product of claim 13, wherein the distribution-based feature analysis is dynamic clustering.

15. An apparatus comprising one or more processors and one or more non-transitory storage mediums comprising instructions that, when executed by the one or more processors, cause the apparatus to:

receive a feature representation of a multi-dimensional data instance having a particular data type and k features, wherein the feature representation includes the k features, each feature of the k features representing a value of a corresponding attribute of the multi-dimensional data instance;

calculate, for each feature of the k features, a per operator estimate confidence value to produce a set of k per operator estimate confidence values, each per operator estimate confidence value associated with a unique operator estimate and representing a probability of the feature representation belonging to a specific distribution, each unique operator estimate associated with an operator powered by a statistical model and configured to clean data;

calculate an operator estimation score for the multi-dimensional data instance using the feature representation, the operator estimation score calculated based on the set of k per operator estimate confidence values and calculated using a trained operator estimator;

calculate, for each global data set of a set of n global data sets, a per data set global estimate confidence value to produce a set of n per data set global estimate confidence values, each per data set global estimate confidence value representing a probability of the feature representation belonging to a corresponding global distribution represented by the global data set;

calculate a global estimation score for the multi-dimensional data instance using the feature representation, wherein calculating the global estimation score is based on the set of n per data set global estimate confidence values;

update at least one initial training data set with the multi-dimensional data instance upon determining that the multi-dimensional data instance will be included in the at least one initial training data set based on the operator estimation score and the global estimation score; and derive at least one model from the at least one initial training data set.

16. The apparatus of claim 15, wherein an operator performs a single data cleaning manipulation action based on a particular statistical model.

17. The apparatus of claim 15, wherein an operator estimate includes multiple operators chained together.

18. The apparatus of claim 15, wherein calculating the global estimation score comprises:

assigning the multi-dimensional data instance to each of a group of n global data sets, wherein each global data set includes data instances having the particular type, and wherein each of the global data sets respectively represents a set of data instances that were collected during a corresponding time window within a group of pre-defined time windows;

generating a set of n per data set global estimate confidence values, each per data set global estimate confidence value being associated with a corresponding global data set; and calculating the global estimation score using the set of n per data set global estimate confidence values.

19. The apparatus of claim 18, wherein generating a data set global estimate confidence value for a dataset comprises:

generating, using a classifier trained on the data set distribution, a per data set global estimate confidence value by estimating a probability that the multi-dimensional data instance belongs to the global distribution of the data set.

20. The apparatus of claim 15, wherein the feature representation is generated automatically from a pool of unlabeled data instances using a distribution-based feature analysis.

21. The apparatus of claim 20, wherein the distribution-based feature analysis is dynamic clustering.

* * * * *